(12) United States Patent
Neels

(10) Patent No.: US 8,337,573 B2
(45) Date of Patent: Dec. 25, 2012

(54) COMPACT FUEL PROCESSOR

(75) Inventor: Jacobus Neels, Rosedale (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 13/214,071

(22) Filed: Aug. 19, 2011

(65) Prior Publication Data

US 2012/0168680 A1  Jul. 5, 2012

Related U.S. Application Data

(63) Continuation of application No. PCT/CA2010/000243, filed on Feb. 19, 2010.

(60) Provisional application No. 61/154,286, filed on Feb. 20, 2009.

(51) Int. Cl.
*B01J 7/00* (2006.01)
*C01B 3/36* (2006.01)
*C01B 3/24* (2006.01)

(52) U.S. Cl. .... 48/61; 48/197 R; 48/198.1; 261/DIG. 12

(58) Field of Classification Search .......... 48/61, 197 R, 48/198.1; 261/DIG. 12
See application file for complete search history.

(56) References Cited

U.S. PATENT DOCUMENTS

| | | | | |
|---|---|---|---|---|
| 2,576,228 A | * | 11/1951 | Kinnaird | 422/224 |
| 2,845,335 A | * | 7/1958 | Hasche | 422/206 |
| 6,221,522 B1 | * | 4/2001 | Zafred et al. | 429/434 |
| 2008/0160250 A1 | | 7/2008 | Adler et al. | |
| 2008/0274021 A1 | * | 11/2008 | Neels et al. | 422/198 |

FOREIGN PATENT DOCUMENTS

WO  2008131562 A  11/2008

OTHER PUBLICATIONS

International Preliminary Report on Patentability on PCT/CA2010/000243 dated Aug. 23, 2011.
International Search Report on PCT/CA2010/000243 dated Jun. 1, 2010.
Written Opinion of the International Searching Authority on PCT/CA20101000243 dated Jun. 1, 2010.

* cited by examiner

*Primary Examiner* — Matthew Merkling
(74) *Attorney, Agent, or Firm* — Corridor Law Group, P.C.

(57) ABSTRACT

A fuel processor for producing a hydrogen-containing product stream from a fuel stream and an oxidant stream incorporates a particulate filter assembly comprising a plurality of filter segments separated by expansion joints to accommodate dimensional changes that result from temperature fluctuations. Other embodiments of a fuel processor incorporate, instead or in addition, one or more of: a flame rod as a temperature sensing device for a reforming reaction; a two-sleeve concentric type heat exchanger; a mixing tube manufactured from an alumina-silica based material; and a wet blanket type of insulation.

24 Claims, 3 Drawing Sheets

Section A-A

Section A-A

COMPACT FUEL PROCESSOR

CROSS-REFERENCE TO RELATED APPLICATIONS

This application is a continuation of International Application No. PCT/CA2010/000243, having an international filing date of Feb. 19, 2010, entitled "Pressure Control System And Method". The '243 international application claimed priority benefits, in turn, from U.S. Provisional Patent Application Ser. No. 61/154,286, entitled "Compact Fuel Processor", filed on Feb. 20, 2009. Each of the '243 international application and the '286 provisional application is hereby incorporated by reference in its entirety.

FIELD OF THE INVENTION

The present technology relates to a fuel processor for producing a hydrogen-containing gas stream, such as a syngas stream. The present apparatus and methods are particularly suitable for fuel processors that are used in engine system applications, where a hydrogen-containing gas is required and space is limited.

BACKGROUND OF THE INVENTION

For engine systems in vehicular or other mobile applications where a supply of hydrogen is required, due to challenges related to on-board storage of a secondary fuel and the current absence of a hydrogen refueling infrastructure, hydrogen is preferably generated on-board using a fuel processor. The hydrogen-containing gas from the fuel processor can be used to regenerate, desulfate and/or heat engine exhaust aftertreatment devices, can be used as a supplemental fuel for the engine, and/or can be used as a fuel for a secondary power source, for example, a fuel cell.

One type of fuel processor is a syngas generator (SGG) that can convert a fuel into a gas stream containing hydrogen ($H_2$) and carbon monoxide (CO), known as syngas. Air and/or a portion of the engine exhaust stream can be used as an oxidant for the fuel conversion process. Steam and/or water can optionally be added.

The SGG can be conveniently supplied with a fuel comprising the same fuel that is used to operate the engine. Alternatively a different fuel can be used, although this would generally require a separate secondary fuel source and supply system specifically for the SGG.

The SGG converts the fuel into syngas by cracking and reforming the fuel. This is an endothermic reaction and occurs at temperatures typically in the range of 600° C.-1400° C. The reaction temperature is dependent on various things such as: the hydrocarbon fuel being used, oxidant being used, whether or not a catalyst is used, the fuel conversion efficiency, the degree of coke or soot (herein referred as "carbon") formation and the temperature limitations of components.

The syngas can be beneficial in processes used to regenerate exhaust after-treatment devices. For other applications, for example, use as a fuel in a fuel cell, the syngas stream may require additional processing prior to use. An example of an SGG has been disclosed in U.S. patent application Ser. No. 12/112,784 filed Apr. 30, 2008 (published Nov. 6, 2008 as U.S. Patent Application Publication No. 2008/0274021, entitled "Compact Fuel Processor"), which is hereby incorporated by reference herein in its entirety.

In vehicular or other mobile applications, an on-board SGG should generally be low cost, compact, light-weight, reliable, durable, and efficiently packaged with other components of the engine system. The SGG can be subjected to numerous on/off cycles, transient conditions, fluctuating and/or intermittent demand, extreme temperatures, temperature spikes, extreme thermal gradients and thermal cycling. Some particular challenges associated with the design and manufacture of fuel processors for vehicular or other mobile applications include the following:

(a) Reducing the volume, weight and cost of an SGG.
(b) Reducing thermal stress on components located within an SGG. Such stress can result in material fatigue and premature failure of materials, components and assemblies. Examples include:
   (1) cracking of components manufactured from ceramic materials, for example, a monolith type particulate filter;
   (2) cracking of a heat exchanger; and
   (3) thermal degradation of a mixing tube.
(c) Reducing damage to SGG components that can occur during assembly. For example, thermal insulation liners manufactured from a ceramic material, tend to be vulnerable to damage during assembly of the SGG.

The present fuel processor with improved reactor design, components and materials of manufacture is effective in addressing at least some of the issues discussed above, both in engine system applications and in other fuel processor applications.

SUMMARY OF THE INVENTION

A fuel processor for producing a hydrogen-containing product stream from a fuel stream and an oxidant stream, comprises a fuel inlet port, an oxidant inlet port, a product outlet port, and a shell housing a reaction chamber. In various embodiments the fuel processor also comprises one or more of the following:

(a) a particulate filter assembly located upstream of the product outlet port, wherein the particulate filter assembly comprises at least two segments with an expansion joint between adjacent segments. The expansion joint is a least partially filled with a resilient material and accommodates thermal expansion and contraction, reducing the likelihood of the filter cracking. The particulate filter assembly can be located at least partially within the reaction chamber or downstream of the reaction chamber. Preferably it is located within the shell of the fuel processor.

(b) a critical flow venturi with an annular particulate filter disposed at least partially around the critical flow venturi, and a thermal insulating layer disposed between the critical flow venturi and the annular particulate filter.

(c) a heat exchanger connected to at least a portion of reaction chamber of the fuel processor to transfer heat at least a portion of time from the product stream to the oxidant stream during operation of the fuel processor, wherein a primarily radiative heat transfer mechanism transfers heat from the product stream to the hot side of the heat exchanger. The heat exchanger can be, for example, a two-sleeve concentric type heat exchanger.

(d) a mixing tube fluidly connected to receive the oxidant stream from the oxidant inlet port and the fuel stream from the fuel inlet port, for forming a combined reactant stream and directing the combined reactant stream substantially axially into the reaction chamber. Preferably the mixing tube is manufactured from a soft ceramic material.

(e) a wet blanket type insulation which defines at least a portion of the reaction chamber. The reaction chamber walls can be formed by inserting a wet blanket type insulation within a shell of the fuel processor and drying the wet blanket insulation onto an inner surface of the fuel processor shell.

(f) a flame rod connected to sense a temperature within the reaction chamber at least periodically during operation of the fuel processor.

Preferably the fuel processor is a non-catalytic syngas generator for producing a syngas stream comprising hydrogen and carbon monoxide.

Methods of operating various embodiments of a fuel processor described above can comprise introducing an oxidant stream and a fuel stream into the fuel processor and mixing them to form a combined reactant stream which is directed into the reaction chamber where it is at least partially converted to form a hydrogen-containing product stream. In some applications, the hydrogen-containing product stream of the fuel processor is supplied to an exhaust after-treatment system of an engine.

In some embodiments of an operating method, at least partially converted reactant stream is directed through a particulate filter assembly. The particulate filter assembly can comprise at least two segments with an expansion joint between adjacent segments as described above.

In some embodiments of an operating method, the oxidant stream and at least a portion of the product stream are directed through a heat exchanger so that heat is transferred, primarily by radiation, from the product stream to a hot side of the heat exchanger during normal operation of the fuel processor.

In embodiments of a fuel processor comprising a flame rod, an operating method can comprise sensing the temperature in the reaction chamber by employing the flame rod, and at least a 24 bit analog-to-digital converter with at least two differential inputs, and controlling operation of the fuel processor utilizing the sensed temperature. A flame rod can be used as the primary or the only method of temperature sensing within the reaction chamber.

BRIEF DESCRIPTION OF THE DRAWINGS

FIG. 2 is a cross-sectional view of an embodiment of a heat exchanger assembly that is incorporated into the syngas generator illustrated in FIGS. 1a and 1b, along section A-A of FIG. 1a.

DETAILED DESCRIPTION OF PREFERRED EMBODIMENT(S)

Figure 1A:
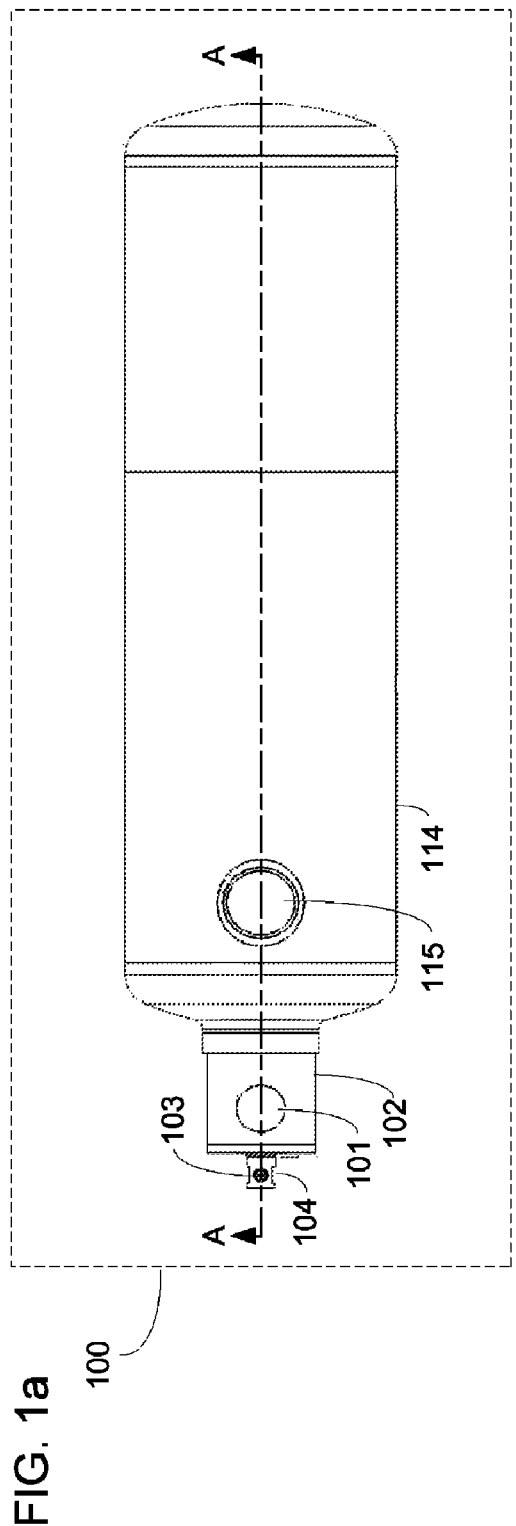
FIG. 1a is a top view of an embodiment of a syngas generator.
Figure 1B:
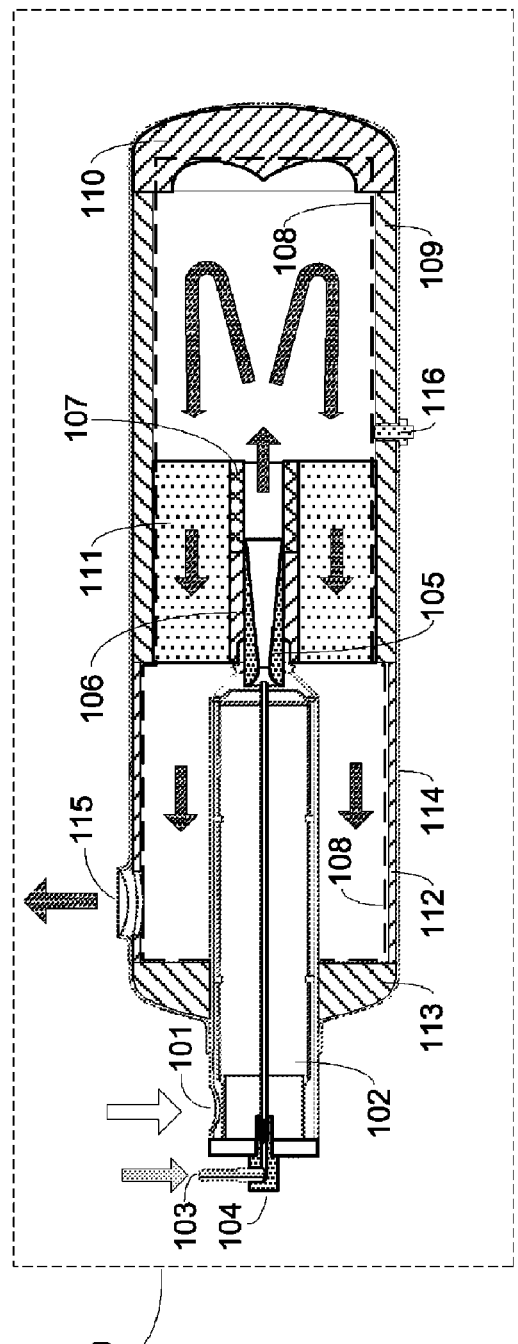
FIG. 1b is a cross-sectional view of the syngas generator illustrated in FIG. 1a, along section A-A.

FIGS. 1a and 1b illustrate an embodiment of a syngas generator (SGG). FIG. 1a is a top view of SGG 100, while FIG. 1b is a cross-sectional view along section A-A of FIG. 1a of SGG 100. In FIGS. 1a and 1b, an oxidant stream enters SGG 100 through oxidant inlet port 101, flowing through heat exchanger (HEX) assembly 102, and into critical flow venturi (CFV) 105. CFV 105 can be thermally insulated with insulation 106. Depending on the operating conditions of the SGG, the flow through the CFV can be choked or unchoked.

A fuel stream enters SGG 100 through fuel inlet port 103, flowing through fuel introduction tube assembly 104, and into the oxidant stream near the inlet or throat of CFV 105. The fuel stream and oxidant stream continue to flow downstream through CFV 105 and into a mixing tube 107, forming a combined reactant stream. The combined reactant stream exits mixing tube 107 at a high speed, for example, above the local flame speed, flowing into a reaction chamber 108 (the boundaries of which are indicated in FIG. 1b by a dashed line), which is formed by insulation 109, insulated turn-around wall 110, insulation 112 and insulation 113.

Reactor shell 114 houses and is thermally insulated from reaction chamber 108 by insulation 109, turn-around wall 110, insulation 112 and insulation 113. The combined reactant stream flows essentially parallel with and close to the longitudinal axis of reaction chamber 108, and impinges on turn-around wall 110, causing the stream to disperse or expand in a diverging radial direction. The combined reactant stream is "reflected" by turn-around wall 110, to turn-around or flow in substantially the opposite direction (from its direction as it exits mixing tube 107) closer to the perimeter walls of reaction chamber 108 and into particulate filter assembly 111, which is located in reaction chamber 108 surrounding CFV 105, insulation 106 and mixing tube 107.

Oxidation and then reforming reaction processes occur gradually as the combined reactant stream moves through reaction chamber 108, converting it into a product syngas stream. The at least partially converted combined reactant stream continues through particulate filter assembly 111. If there is some unreacted combined reactant stream remaining, it can be further converted as it passes through the particulate filter.

Carbon particulates are trapped in annular particulate filter assembly 111 and stored until a carbon removal process is initiated, or alternatively are immediately oxidized by a continuous carbon removal process. The carbon removal process can include various mechanisms including, for example, combustion, oxidation and gasification. The product syngas stream continues to flow towards the end of reaction chamber 108 that is opposite to turn-around wall 110, before exiting SGG 100 via product outlet port 115. An ignition device, including for example, a glow plug (not shown in FIG. 1a or 1b) can be employed to initiate the oxidation and reforming reaction processes.

A temperature sensing device 116 can be employed to sense the temperature in reaction chamber 108 and aid in the control of the reforming reaction process. In conventional fuel processors, thermocouples have been employed as temperature sensing devices. These can have limited durability when exposed to the extreme temperatures, for example, greater than about 1000° C. that are typically encountered in a non-catalytic fuel processor.

In conventional industrial burners where a fuel is combusted to specifically to generate heat, a flame rod is sometimes used to detect the presence of a flame. The resistance of a flame rod can change when exposed to varying temperatures, however the change in resistance can be very low, for example, about 1 ohm per 100° C. With a low resistance device, it can be difficult to obtain the resolution desired to accurately sense a temperature over a wide range and to differentiate a change in temperature from electronic noise. The temperature inside reaction chamber 108 can range from about −40° C. to 1400° C. In embodiments of the present SGG, a flame rod 116 can be employed, not as a flame detection device, but as a temperature sensing device. A single flame rod can be employed, without the need for additional devices such as thermocouples, to sense the temperature of the primary reaction process in the SGG. Preferably flame rod 116 is located near the outer wall of the reaction chamber which can reduce exposure of the flame rod to extreme temperatures and increase its durability.

In some embodiments a flame rod output can be sensed and converted by a programmable controller with an analog-to-digital converter (ADC) with digital filtering capabilities, for example, 18-bit or greater with two or more analog differential inputs, or more preferably 24-bit or greater with two or more analog differential inputs. A high bit ADC can enable the desired resolution when using a flame rod to sense temperature over a wide range. The digital filtering can reduce noise and interference, which can increase accuracy.

Embodiments of fuel processors incorporating a tube-in-tube or concentric sleeve type heat exchanger, utilizing three sleeves, have been described in aforementioned published U.S. patent application Ser. No. 12/112,784 filed Apr. 30, 2008 (U.S. Patent Application Publication No. 2008/0274021 published Nov. 6, 2008) entitled "Compact Fuel Processor". Considerations in selecting the type of heat exchanger and the number of sleeves employed in a concentric sleeve type heat exchanger include, for example, volume, cost, durability, physical layout, operating temperature, heat transfer mechanisms of the heat exchanger, temperature limitation of materials and components, reactant utilized and pre-heating requirements of the reactant.

Figure 2:
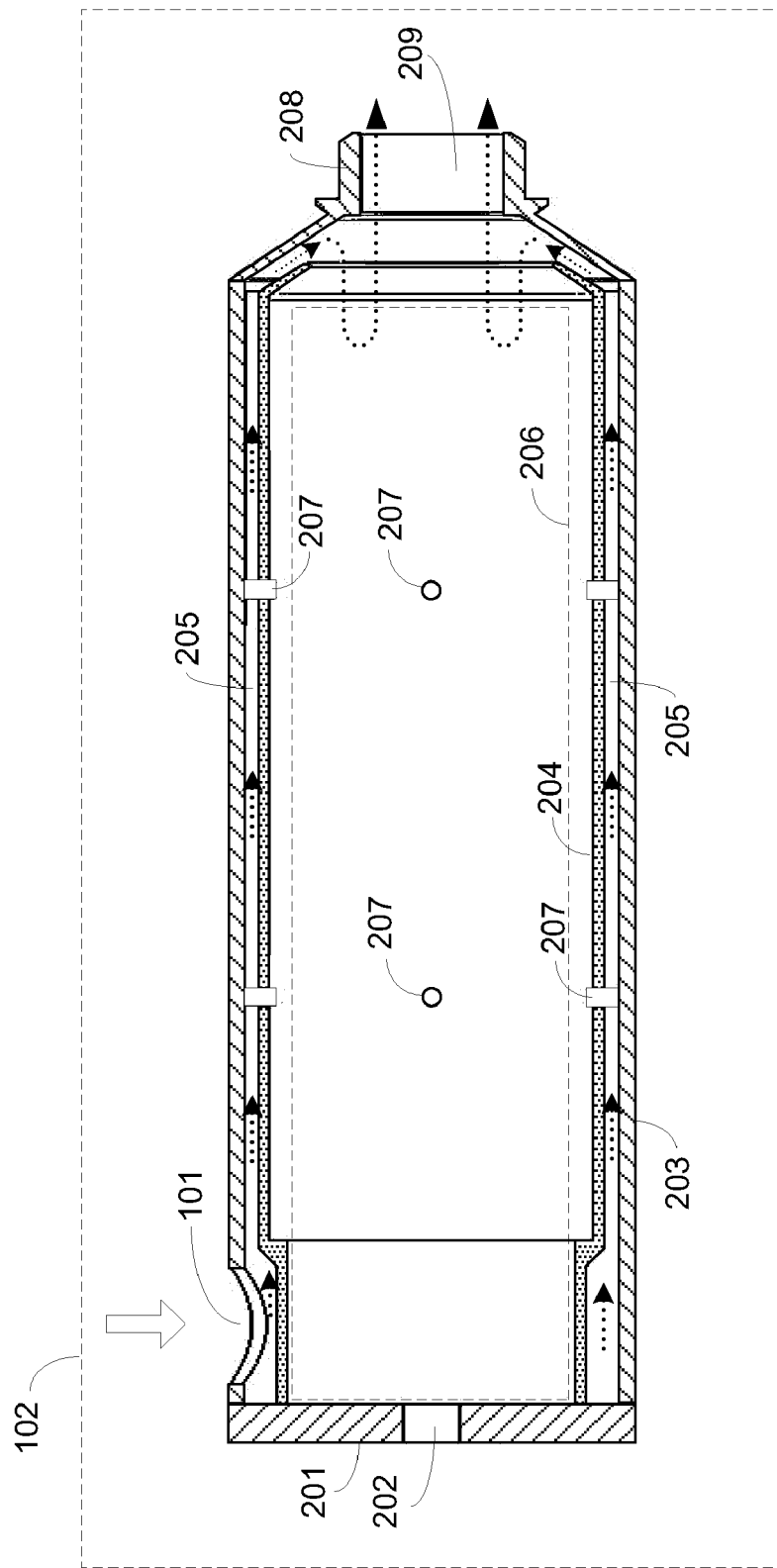

Referring to FIGS. 1a and 1b, and 2, HEX assembly 102 is a heat exchanger which transfers heat from the typically hotter product syngas stream to the typically cooler incoming oxidant stream. FIG. 2 is a cross-sectional view of HEX assembly 102 shown in FIGS. 1a and 1b, along section A-A of FIG. 1a.

In this embodiment, HEX assembly 102 comprises a two-sleeve tube-in-tube or concentric sleeve type of heat exchanger with the sleeves located concentrically: outer sleeve 203 and inner sleeve 204. At least a portion of HEX assembly 102 is located within reaction chamber 108 of SGG 100 where at least a portion of outer sleeve 203 is surrounded by or is in contact with the product syngas stream, prior to the product syngas stream exiting SGG 100. Outer sleeve 203 and inner sleeve 204 form an annular outer chamber 205 through which the oxidant stream flows from oxidant inlet port 101 into oxidant chamber 206 (indicated in FIG. 2 by a dashed line) and into CFV 105 (shown in FIG. 1b). A plurality of spacers 207 assists in locating outer sleeve 203 at a distance from inner sleeve 204. Port 202, located in cap 201, accommodates fuel introduction tube assembly 104 (shown in FIG. 1b) while cap 201 is attached to and assists in sealing one end of annular outer chamber 205. End cap 208 can be attached to outer sleeve 203, while port 209 accommodates CFV 105 (shown in FIG. 1b). HEX assembly 102, is located concentrically about the longitudinal axis of combustion chamber 108 and SGG 100, with the sleeves configured so that the product syngas stream and oxidant stream flow though the HEX assembly 102 in a co-flow direction.

The heat transfer mechanism from the product syngas stream to the exterior surface of HEX assembly 102, or more specifically outer sleeve 203, is mainly through radiation. For example, preferably about 60%-99% of the heat is transferred through radiation, more preferably 75%-99% of the heat transferred through radiation and even more preferably 90%-99% of the heat transferred through radiation.

HEX assembly 102 can be subject to extreme temperatures (for example, up to about 1400° C.), thermal gradients (for example, up to about 1400° C.), thermal cycling and thermal stress. During operation of the SGG, the oxidant stream can be at a greater pressure than the product syngas stream. Failures including, for example, cracks or other seal failures of the heat exchanger assembly could cause at least a portion of the oxidant stream to leak into the product stream, creating a gas mixture that could be potentially hazardous at extreme temperatures.

HEX assembly 102 can be preferably fabricated with a reduced quantity of separate components and joints to increase its durability. HEX assembly 102 and/or its components are more preferably fabricated from a single piece of material to increase durability of the overall assembly. A two-sleeve tube-in-tube or concentric sleeve type of heat exchanger can offer the advantages of reduced volume, reduced cost (for materials and manufacturing), and increased durability. A heat exchanger utilizing a primarily radiant heat transfer mechanism from the hot product syngas stream to the heat exchanger, or outer sleeve of the heat exchanger, can offer the advantages of reducing the variation in temperature of the oxidant stream as it leaves the heat exchanger assembly, elimination of a third or additional sleeves, and reduced volume and cost of the heat exchanger assembly.

The particulate filter assembly 111 can comprises a wall-flow monolith manufactured from a single brick of ceramic material including, such as for example, silicon carbide or cordierite. Under certain conditions, such a monolith has a tendency to fracture as a result of excessive thermal stress during operation of the fuel processor. Fractures can result in an undesirable increase in slip or flow of carbon particulates past the particulate filter and out of the fuel processor.

Figure 3:
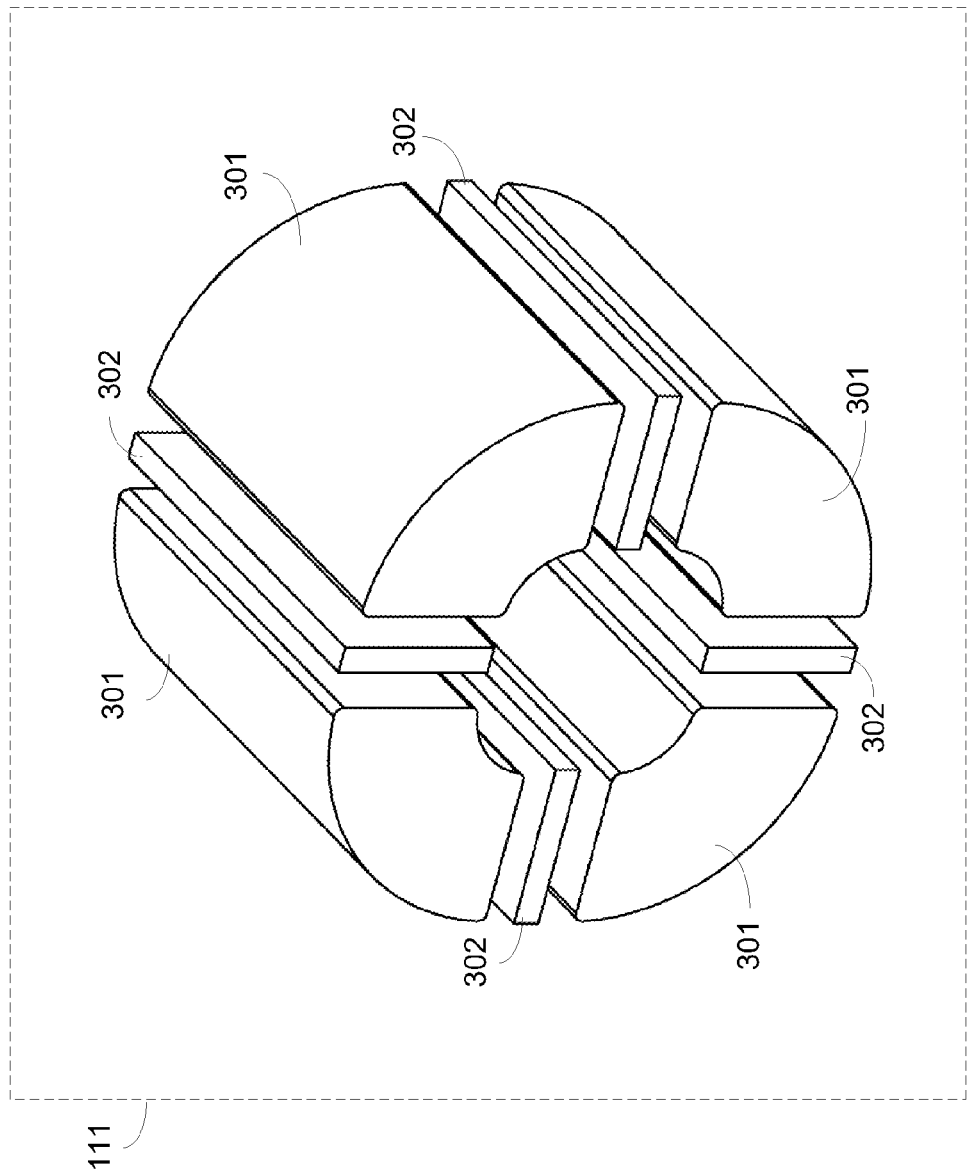
FIG. 3 is an exploded view of an embodiment of a particulate filter assembly that is incorporated into the syngas generator illustrated in FIGS. 1a and 1b.

In some embodiments (referring to FIGS. 1b and 3), particulate filter assembly 111, can be a wall-flow monolith, which comprises two or more filter segments or bricks, with the segments separated by a seam or expansion joint. At least a portion of the joint between adjacent filter segments is filled by with a material that forms a soft seal which allows for thermal expansion and can withstand the extreme temperatures of the SGG. Preferably the filler material has some resilience and/or is less brittle or vulnerable to fracturing, and has a low thermal conductivity. For example, the filler material can comprise a thermal insulating support mat manufactured at least partially from ceramic materials. In the embodiment illustrated in FIG. 3, an exploded view of particulate filter assembly 111 comprises four individual filter segments 301 separated by filled expansion joints 302.

The material in expansion joints 302 allows for some movement of filter segments 301. This can reduce stresses and the tendency for fractures to develop due to thermal expansion, thermal gradients and/or manufacturing tolerances. The thickness of the joint can be appropriately sized to accommodate the expected degree of movement. In the illustrated embodiment, expansion joints 302 are oriented parallel to the longitudinal axis of particulate filter assembly 111. Optionally, in addition or instead, expansion joints can be oriented at varying and various other angles and formed in varying and various other shapes than illustrated.

Preferably the filler material provides a good seal between segments (which can reduce the flow of carbon particulates by-passing the filter segments), has low thermal conductivity (which can beneficially reduce the thermal gradient and heat flow between filter segments), can withstand extreme operating temperatures, can withstand wide range of operating temperatures, can withstand a high quantity of thermal cycles and can withstand high forces while maintaining its strength. Optionally a similar material can be employed around the exterior circumference of particulate filter assembly 111 (between it and insulation 109). This can also reduce mechanical stress on particulate filter assembly 111 and/or beneficially reduce the heat loss from the particulate filter assembly during certain operating conditions including, for example, the start-up process of SGG 100. Also optionally a similar material can be employed around the interior circumference or inner ring, between particulate filter assembly 111 and mixing tube 107, insulation 106 and/or CFV 105. This can also reduce mechanical stress on particulate filter assembly 111, and the thermal insulating properties of the material can beneficially reduce the heat loss from mixing tube 107 and CFV 105 during certain operating conditions including, for example, the start-up process of SGG 100, as well as, reduce the flow of heat from particulate filter assembly 111 to mixing tube 107 and CFV 105 during normal operating conditions, reducing the potential for combustion within while increasing the durability of the mixing tube 107 and CFV 105. In another embodiment CFV 105 is thermally insulated from particulate filter assembly 111 by insulation 106 which can reduce the heat flowing from particulate filter assembly 111 to CFV 105 during normal operating conditions, reducing the potential for combustion within CFV 105 and increasing the durability of CFV 105. Optionally, the particulate filter assembly and/or filter segments can be configured in varying and various shapes (other than the annular shape illustrated in FIGS. 1 and 3) and/or located within a SGG different to that illustrated in FIG. 1. For example, the cross-section (perpendicular to the flow of the gas stream) of a filter segment can be shaped similar to a pie, triangle, square, or rectangle.

In certain applications and operating conditions, extreme temperatures and thermal gradients, for example, up to about 1400° C., can occur within a reaction chamber of a fuel processor. Without adequate heat dissipation or cooling of the components, the components can reach extreme temperatures at or above the auto-ignition temperature of the combined reactant stream. This can cause spontaneous combustion of the combined reactant stream in the reaction chamber and/or thermally degrade, oxidize and/or fracture components including, for example, the mixing tube 107.

Components manufactured from materials including for example, alumina and hard ceramics have been employed with mixed results in such harsh environments. In some embodiments, mixing tube 107 can be manufactured from a soft ceramic material including, for example, an alumina-silica based material, which has a thermal conductivity sufficient to dissipate heat and maintain the temperature of the mixing tube below the auto-ignition temperature of the combined reactant stream, can withstand the operating conditions of the reaction chamber and withstand thermal shock.

Under certain operating conditions including, for example, when the temperature of a fuel processor is below a desired temperature or during start-up of a fuel processor, incomplete vaporization and combustion of the fuel reactant can occur. It has been found that the use of materials with some degree of porosity or absorbency for the mixing tube (or other components that are in contact with the fuel stream) can be beneficial, for example, a porosity of about 60%-86%. Potentially such materials retain insufficiently vaporized fuel or droplets of fuel until the temperature of the fuel processor increases to a level which can sufficiently vaporize the fuel. For example, mixing tube 107 can be manufactured from a soft ceramic material such as an alumina-silica based material that has a level of absorbency sufficient to absorb insufficiently vaporized fuel.

One factor which can limit the ability to reduce the overall size of a fuel processor is the heat flux (flow of heat per unit of surface area per unit of time) from the fuel processor. In certain applications it can be desirable to increase the heat flux in order to reduce the overall volume of a fuel processor. However, thermal insulation can be desirable to thermally insulate the shell of the fuel processor from the extreme temperatures of the reaction chamber, allowing for the shell to be manufactured from standard and lower cost materials.

In some embodiments, insulation 109, turn-around wall 110, insulation 112 and insulation 113 can be a wet blanket type of insulation manufactured from a soft ceramic material including, for example, alumina-silica based material, which can be formed, optionally bonded and dried inside of shell 114 during assembly of SGG 100. Soft ceramic materials offer the advantages including the ability to withstand vibration and the operating conditions of the reaction chamber. The wet blanket (or wet felt) type of insulation enables the utilization and assembly of a thinner layer of insulation, increasing the ease of assembly, and reducing the probability of damage during assembly as the insulation is flexible and can be formed into shape, prior to drying.

In preferred embodiments of the apparatus and methods described above, the fuel processor is a syngas generator (SGG) that is a non-catalytic partial oxidation reformer which during normal operation is operated to produce a syngas stream. However, the fuel processor components, materials and methods described herein can be implemented in various types of fuel processors including other types of SGGs, reformers or reactors used to produce hydrogen-containing gas streams. These can be of various types, for example, catalytic partial oxidizers, non-catalytic partial oxidizers, and/or autothermal reformers. Suitable reforming and/or water-gas shift catalysts can be employed in the fuel processor.

The fuel supplied to the fuel processor can be a liquid fuel (herein meaning a fuel that is a liquid when under IUPAC defined conditions of standard temperature and pressure) or a gaseous fuel. Suitable liquid fuels include, for example, diesel, gasoline, kerosene, liquefied natural gas (LNG), fuel oil, methanol, ethanol or other alcohol fuels, liquefied petroleum gas (LPG), or other liquid fuels from which hydrogen can be derived. Alternative gaseous fuels include natural gas and propane.

The fuel processor can be deployed in various end-use mobile or stationary applications where a hydrogen-consuming device is employed. The product stream can be directed to one or more hydrogen-consuming devices for example an exhaust after-treatment device, a fuel cell, or an engine.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel processor for producing a hydrogen-containing product stream from a fuel stream and an oxidant stream, said fuel processor comprising a fuel inlet port, an oxidant inlet port, a product outlet port, and a shell housing a reaction chamber, wherein said fuel processor further comprises:
    (a) a critical flow venturi;
    (b) an annular particulate filter disposed at least partially around said critical flow venturi;
    (c) a thermal insulating layer disposed between said critical flow venturi and said annular particulate filter.

2. The fuel processor of claim 1, wherein said annular particulate filter is located upstream of said product outlet port and comprises at least two segments with an expansion joint between adjacent segments.

3. The fuel processor of claim 2, wherein said expansion joint is a least partially filled with a resilient material.

4. The fuel processor of claim 3, wherein said resilient material comprises a ceramic-containing material.

5. The fuel processor of claim 2, wherein said annular particulate filter is positioned to trap particulates from a gas stream flowing through it in a flow direction between said reaction chamber and said product outlet port, and wherein said expansion joints are oriented substantially parallel to the flow direction through said annular particulate filter.

6. The fuel processor of claim 2, wherein said annular particulate filter is located at least partially within said reaction chamber.

7. The fuel processor of claim 2, wherein said annular particulate filter is located downstream of said reaction chamber.

8. The fuel processor of claim 2, wherein said particulate filter assembly is located within said shell of said fuel processor.

9. The fuel processor of claim 1, further comprising a heat exchanger connected to at least a portion of said reaction chamber to transfer heat at least a portion of time from said product stream to said oxidant stream during operation of said fuel processor, wherein a radiative heat transfer mechanism from said product stream to the hot side of said heat exchanger is 60%-99%.

10. The fuel processor of claim 9 wherein said heat exchanger further comprises a two-sleeve concentric type heat exchanger.

11. The fuel processor of claim 1 further comprising a mixing tube fluidly connected to receive said oxidant stream from said oxidant inlet port and said fuel stream from said fuel inlet port, for forming a combined reactant stream and directing said combined reactant stream substantially axially into said reaction chamber, wherein said mixing tube is manufactured from a soft ceramic material.

12. The fuel processor of claim 11 wherein said soft ceramic material has a porosity of 60%-86%.

13. The fuel processor of claim 11 wherein said soft ceramic material comprises an alumina-silica based material.

14. The fuel processor of claim 1 further comprising a wet blanket type insulation which defines at least a portion of said reaction chamber.

15. The fuel processor of claim 1, further comprising a flame rod connected to sense a temperature of said reaction chamber at least periodically during operation of said fuel processor, wherein said temperature of said reaction chamber is a measurement of a primary reaction process in said reaction chamber.

16. The fuel processor of claim 15 wherein said fuel processor further comprises a controller with an analog-to-digital converter (ADC) with digital filtering capabilities.

17. The fuel processor of claim 16 wherein said analog-to-digital converter is at least 24 bit.

18. The fuel processor of claim 17 wherein said analog-to-digital converter is at least two differential inputs.

19. A method of operating a fuel processor, said method comprising:
(a) introducing an oxidant stream and a fuel stream into said fuel processor
(b) flowing said oxidant stream and said fuel stream through a critical flow venturi into a mixing tube where said fuel and oxidant streams mix to form a combined reactant stream;
(c) at least partially converting said combined reactant stream to form a hydrogen-containing product stream;
(d) directing said hydrogen-containing product stream through an annular particulate filter assembly disposed at least partially around said critical flow venturi wherein said critical flow venturi is thermally insulated from said annular particulate filter by a thermal insulating layer.

20. The method of claim 19 wherein said annular particulate filter assembly comprises at least two segments with an expansion joint between adjacent segments to accommodate thermal expansion of said particulate filter assembly.

21. The method of claim 19 further comprising:
(e) directing said oxidant stream into a heat exchanger and directing at least a portion of said product stream to contact at least a portion of said heat exchanger;
(f) transferring greater than 60% of heat by radiation from said product stream to a hot side of said heat exchanger during normal operation of said fuel processor.

22. The method of claim 21 further comprising directing said product stream and said oxidant stream in a co-flow direction through said heat exchanger.

23. The method of claim 19 further comprising:
(e) sensing the temperature in said reaction chamber by employing a flame rod, and at least a 24 bit analog-to-digital converter with at least two differential inputs; and
(f) controlling operation of said fuel processor utilizing said sensed temperature.

24. The method of claim 19 wherein said hydrogen-containing product stream of said fuel processor is supplied to an exhaust after-treatment system of a combustion engine.

* * * * *